United States Patent [19]

D'Entremont

[11] 3,891,008

[45] June 24, 1975

[54] MULTI-LAYER THERMOPLASTIC FILM AND METHOD OF MAKING SAME

[75] Inventor: Donald J. D'Entremont, Greenville, S.C.

[73] Assignee: W. R. Grace & Co., Duncan, S.C.

[22] Filed: Dec. 26, 1973

[21] Appl. No.: 428,541

[52] U.S. Cl. ............ 138/146; 156/244; 260/897 A; 264/22; 264/173; 264/210 R; 427/35; 427/172; 427/296; 427/407; 428/36; 428/516; 428/518; 428/520; 428/910
[51] Int. Cl.² ...................... B32B 27/32; B29D 9/08
[58] Field of Search ....... 117/161 UH, 122 H, 76 F, 117/94, 7, 138.8 E; 260/897 A; 156/244; 264/173; 161/252, 256; 138/146

[56] References Cited

UNITED STATES PATENTS

| | | | |
|---|---|---|---|
| 3,733,373 | 5/1973 | McConnell et al. | 260/897 A |
| 3,754,063 | 8/1973 | Schirmer | 117/161 UH |

*Primary Examiner*—Ralph Husack
*Attorney, Agent, or Firm*—John J. Toney; William D. Lee, Jr.

[57] ABSTRACT

An improved polymeric composition comprising a blend of polybutene-1 with an ethylene-propylene copolymer which, when combined with a shrinkable, cross-linked polymer of ethylene, produces a laminate having improved abuse and tear resistance and reduced self-adherence.

11 Claims, 5 Drawing Figures

PATENTED JUN 24 1975　　　　　　　　　3,891,008

SHEET 3

MULTI-LAYER THERMOPLASTIC FILM AND METHOD OF MAKING SAME

FIELD OF THE INVENTION

This invention relates to blended compositions for producing thermoplastic films and like articles. More specifically, this invention relates to a layer composition for multilayer thermoplastic films which are created by extrusion coating or other process for lamination which will produce oriented, heat-shrinkable films.

BACKGROUND OF THE INVENTION

The use of heat-shrinkable thermoplastic films in many packaging applications is well known. Usually a product is enclosed in a film, sealed, and then heat is applied thus shrinking the film snugly about the product. One of the most useful and satisfactory thermoplastic materials for packaging film is polyethylene. In the prior art, there are a number of methods to convert raw polyethylene into a suitable, heat-shrinkable packaging film. One such method is disclosed in U.S. Pat. No. 2,855,517 issued to W. C. Rainer et al. on Oct. 7, 1958. Another method is taught by U.S. Pat. No. 3,022,543 issued to W. G. Baird, Jr. et al. on Feb. 27, 1962. In the Baird method, polyethylene is continuously extruded in the form of a tube, drawn, irradiated with electrons to crosslink the molecules, heated, and stretched again by applying internal pressure to the tubing. The resulting film usually has good heat shrinking properties but relatively low tear strength. Once a tear has begun it tends to rapidly propagate during the heat shrinking process resulting in destruction of the film. One method of overcoming this low tear strength is disclosed in U.S. Pat. No. 3,754,063 issued to Henry G. Schirmer on Aug. 21, 1973. In the Schirmer patent, a method of extrusion coating crosslinked polyethylene with a layer comprising a mixture of isotactic polypropylene, polybutene-1, and atactic polypropylene to improve the tear strength, bursting resistance, and heat sealing properties of polyethylene is taught. However, while packaging materials, particularly bags for food products, made from the coated polyethylene material disclosed in the Schirmer patent are generally quite satisfactory, it was discovered that it was necessary to dust bags and films made from such coated polyethylene with cornstarch in order to prevent them from sticking together during storage. This dusting proved to be a time consuming production step and the dust, while not harmful, is an annoyance in handling the bags. Thus, it is an object of the present invention to provide a superior packaging material which does not require excessive dusting.

Another object of the present invention is to provide a coated polyethylene film product having improved abuse resistance and orientation properties with a reduced stickiness or tackiness.

Still another object is to provide a film which is easier to handle, stack, and use when made into pouches and bags.

The accomplishment of these and other objects will become obvious from the description of the present invention which follows.

SUMMARY OF THE INVENTION

In one aspect, the present invention is a blended coating composition for thermoplastic substrates which comprises a major portion which is a copolymer of ethylene and propylene and a minor portion which is polybutene-1. Preferably, the copolymer is present in the coating composition in the range of 60 to 95 percent by weight and the polybutene-1 is present in the range of 5 to 40 percent by weight. Furthermore, in the aformentioned preferred ranges, the polypropylene constituent of the copolymer is substantially greater than the ethylene constituent, the ethylene constituent preferably being present in the range of 2.5 to 4 percent by weight but it may be as high as 10 percent by weight. The optimum coating composition has been found to be one in which the polybutene-1 comprises about 25 percent by weight of the blended coating and the ethylene-propylene copolymer comprises about 75 percent by weight of the blend with the ethylene part of the copolymer being in the range of 3.0 to 3.5 percent.

In another aspect, the present invention is a blended composition which may form a layer in a multilayer thermoplastic film which comprises a substrate layer of an oriented thermoplastic material in combination with a layer comprising the blended mixture of the present invention. In still another aspect, the present invention is a method of improving the tear and abuse resistance of and reducing the tackiness or stickiness of a multilayer, oriented thermoplastic film by coating the substrate with a blended mixture comprising a major portion of ethylene-propylene copolymer and a minor portion of polybutene-1.

DESCRIPTION OF THE DRAWINGS

The present invention may be better understood by reference to the following detailed description and drawings in which.

PREFERRED EMBODIMENT

The process for making the preferred embodiment of the present invention will be first briefly described and then the test results which led to the discovery of the preferred embodiment will be explained. The process is essentially the same as that disclosed in U.S. Pat. No. 3,754,063, mentioned above, and a brief description of the process is included here for better understanding of this invention.

Figure 5:
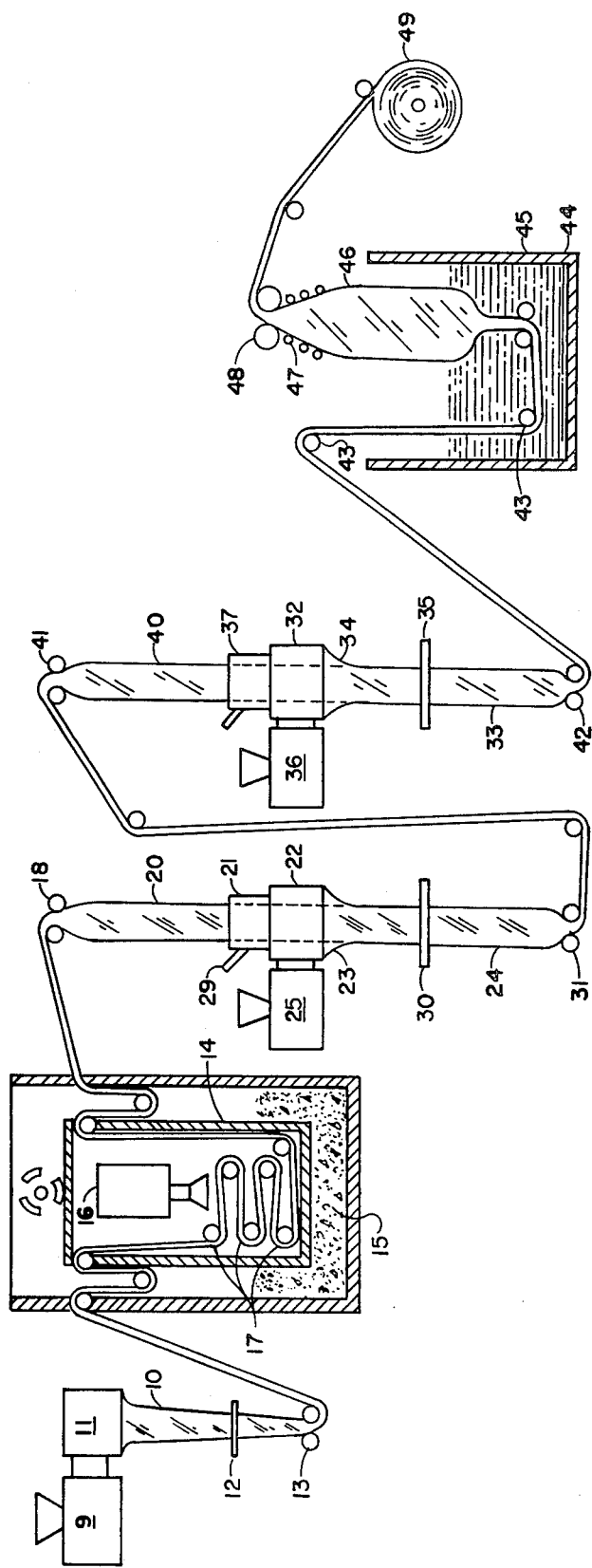

Turning now to FIG. 5, extruder 9 is shown from which extrudate 10 in tubular form emerges from circular die 11. This extrudate may be polyethylene or may be a copolymer of ethylene-vinyl acetate with 2 to 4 percent vinyl acetate. As the extrudate moves downwardly, it is cooled by cooling ring 12 before it is collapsed and passed around pinch rolls 13. The now flattened tubing enters irradiation vault 14 having shielding 15 around it and the flattened tubing is threaded through festooning rolls 17 in order to make a number of passes through the electron beam which emanates from electron accelerator 16. This electron irradiation induces crosslinking of the long chain polyethylene molecules. After leaving the irradiation vault 14, the flattened tubing passes through pinch rolls 18 where it is thereafter opened as inflated tubing 20 to pass through circular die 22 which is fed from extruder 25. Die 22 will either in one embodiment, coat infalted tubing 20 with the blend of polybutene-1 and ethylene-propylene copolymer or, in another embodiment, die 22 will coat an adhesive comprising an ethylene-vinyl acetate copolymer with 7 to 20 percent vinyl acetate onto inflated tubing or substrate 20. Vacuum chamber 21 which surrounds the inflated tubing 20 has vacuum line 29 attached thereto and the vacuum chamber 21 is used to suck in the extruded coating 23 so that it adheres uniformly to the tubing 20 without any bubbles of air being trapped between the tubing and the coating. Leaving the die 22 the now coated substrate 24 passes through cooling ring 30 before it is collapsed in pinch rolls 31. If no adhesive has been employed as an intermediate layer the collapsed tubing could be immediately fed to the hot water bath tank 44 for orientation. However, when the adhesive is applied the coated substrate will be fed again through pinch rollers 41 and opened as coated substrate 40 passes through vacuum chamber 37 on its way to coating die 32 which is fed by extruder 36. Extruder 36 will feed the molten blended coating mixture of the present invention to die 32 where the coating 34 is again sucked onto the coated substrate 40. The tubing 33 now has an adhesive layer plus a coating layer, and as it passes through cooling ring 35 the coating is brought below its melting point so that the tubing can be collapsed by pinch rolls 42. The collapsed tubing is threaded around rolls 43 into hot water bath 45 within tank 44. The water 45 is maintained at or close to its boiling point of 212° F which is below the melting point of the irradiated polyethylene substrate but is within the temperature range in which the substrate can be oriented. As the coated tubing moves upwardly and out of the heated bath it expands under the internal air pressure maintained in the bubble 46 and is stretch oriented into film thickness. Thereafter it is collapsed by rollers 47, passed through rolls 48 and wound up on wind up roll 49.

Following the procedure as described with reference to FIG. 5, an ethylene vinyl acetate copolymer containing approximately 3½ percent vinyl acetate is fed into the hopper of extruder 9 which is a 2½ inch Hartig extruder which is operated at the following temperatures: rear zone 300°F; mid barrel 330° to 350°F; front barrel 350°F; adaptor 350°F; and die 350°F. The extrudate or extruded tubing leaving the die has a lay flat width of approximately 2 7/16 inches and a wall thickness of 0.018 inch. In the irradiation vault 14, this tubing receives a dosage of about 6.3mr. In the preferred embodiment, the irradiated substrate 20 continues to a die 22 where the adhesive coating is applied by extrusion and there a crosshead die is fed by a Prodex extruder wherein all zones of the extruder, the adaptor, and the die are kept at 450°F. The preferred coating is an ethylene vinyl acetate copolymer containing about 8½ percent vinyl acetate and the coating thickness is approximately 0.003 inch. After receiving the adhesive coating, the tubing 40 passes through a second crosshead die 32 to receive a coating according to the present invention. To prepare the blend before it is fed into the hopper of extruder 36, pellets of ethylene-propylene copolymer containing 3.1 percent ethylene are blended in a Banbury mixer with pellets of polybutene-1 in the ratio of 75 percent copolymer by weight and 25 percent polybutene-1 by weight. All zones of the extruder range between 450° and 480°F and the resulting coating thickness is 0.006 inches. Water is impinged on the heated tubing at 62°F by the cooling rings 30 and 35 at their respective locations. To reach the final film thickness and become an oriented film, the tubing is fed into the hot water bath 44 which is maintained between 210° and 212°F and the internal pressure of the bubble 46 is sufficient to stretch the tubing to a film which has approximately 8 inches of lay flat width and has a wall thickness of 2.2 mils.

Figure 1:
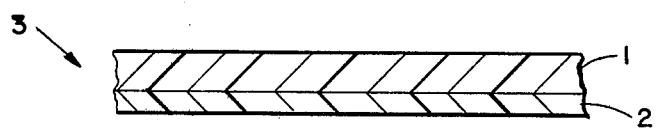
FIG. 1 is a fragmentary cross section of a multilayer thermoplastic film having a layer comprising the blended composition according to the present invention.
Figure 2:
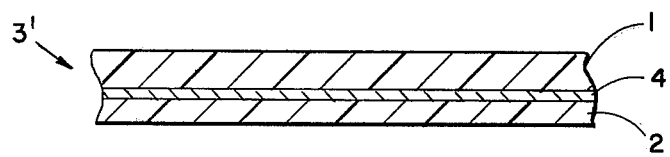
FIG. 2 is a fragmentary multilayer thermoplastic film according to the present invention with an intermediate adhesive layer.

Tubing which has been produced in the foregoing manner without an intermediate adhesive coating will have a cross sectional apprearance as shown in FIG. 1 where laminate 3 is shown with substrate 1 having coating 2 adhered thereto by extrusion coating. When the intermediate adhesive layer is employed, the cross section of film prepared by the foregoing described manner will have an appearance and cross section as shown in FIG. 2 where laminate 3' is composed of substrate 1 having adhesive coating 4 with extrusion coating 2 applied thereto.

Figure 3:
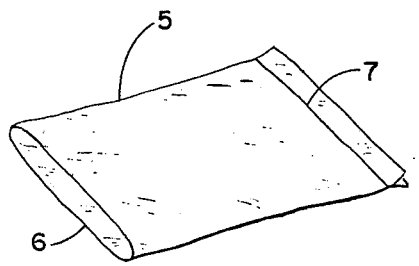
FIG. 3 is a bag produced from tubular, multi-layer thermoplastic film prepared according to the present invention.

The tubing which has been prepared as described hereinabove and rolled upon wind up roll 49 can be convereted into bags by sealing the bottom of the bag by heat sealing across the entire width of the tubing and then severing the tubing at the desired bag length. In FIG. 3, a prepared bag 5 is shown with its bottom being sealed off by the continuous heat seal 7 and the mouth 6 being prepared by severing the tubing from the previously formed bag.

The following tests were run under commercial conditions using bags made from tubing which was produced substantially as has been heretofore described. Each test was made in a commercial plant and involved the packaging of dressed poultry such as turkeys or baking hens. Depending on the size of the birds to be packaged the width of the bags will range from 8 to 18 inches and the length will range up to 27 inches. To package a bird, it is inserted into a bag, the bag is evacuated by a vacuum nozzle with the bag neck held around the nozzle, the bag neck is then twisted and closed with a metal clip. The closed bags are then passed through a hot water shrink tunnel which is operated in the range of 205° to 208°F whereupon the bag shrinks skin tight around the bird.

This type of packaging for the test results reported below was carried out at various poultry packers in actual production runs to determine the abuse resistance of the bags. In each test run, the number of bags tested; and hence, the number of birds packaged was usually in the order of 2,000 packages. When being filled, evacuated, clipped, hot water shrunk, and moved at production speeds by conveyors the bags loaded with relatively heavy turkeys undergo quite severe abuse. Records were kept of the number of failures and a failure was considered to occur when the package integrity is ruined such as by a tear or cut into the bag. In each test run standard bags were also used and the standard bag against which the abuse resistance results were compared is a standard bag made according to the process described in the aforementioned U.S. Pat. No. 3,754,063.

Figure 4:
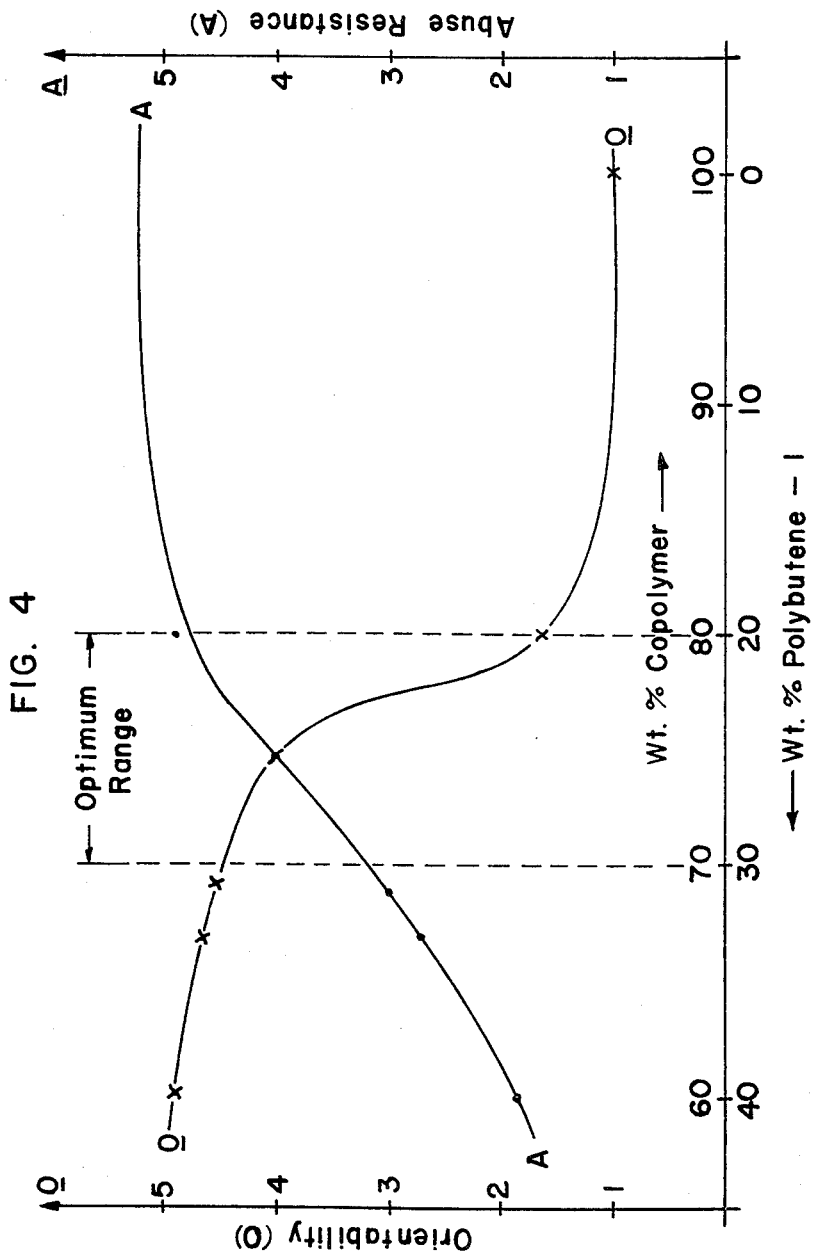
FIG. 4 is a graphical representation of two curves, one curve being orientability of multilayer films according to the present invention versus the coating composition proportions and the other curve being abuse resistance versus coating composition proportions; and, FIG. 5 is a schematic representation of the process for making a multilayer film according to the present invention.

Before listing the specific test examples the graph of FIG. 4 should be explained. The abscissa of the graph represents the proportion of copolymer to polybutene-1. The percentage of copolymer increases towards the left and percentage of polybutene-1 increases towards the right. The ethylene-propylene copolymer used for this graph has an ethylene content in the range of 3.0 to 3.5 weight percent. The two curves in the graph are designated O—O and A—A for orientability and abuse resistance respectively. Orientability is also called "rackability" in the art and this is a measure of the ability of a tubular film to be oriented, particularly to be oriented in the trapped bubble technique as described with relation to FIG. 5. Abuse resistance was determined in actual packing house tests as described above. The units on the two ordinates in FIG. 4 are relative figures of merit and range from 1 to 5 with 1 being unacceptable or very poor; 2 being poor and generally unsatisfactory; 3 being average and acceptable; 4 being above average; and 5 being excellent. For example, an orientability of 1 means that an orienting bubble cannot be sustained for production purposes; and, as can be seen in FIG. 4, it is not until the polybutene-1 content has been increased to about 20 percent that there becomes any significant increase in the orientability of the blended mixture. As the copolymer/polybutene-1 ratio goes from 80/20 to 70/30 a marked increase in the orientability of the blend is observed. On the other hand, the abuse resistance rises somewhat slowly and also significantly improves the 80/20 to 70/30 range. A crossover point occurs at a copolymer/polybutene-1 ratio of 75/25 and this blend ratio provides an optimum combination of orientability and abuse resistance. Outside of the optimum range shown in FIG. 4 orientability becomes too poor as the copolymer is increased beyond 80 percent to make feasible continuous production; and, when the proportion of a copolymer is less than 70 percent the abuse resistance drops off significantly and resulting packages are not commercially acceptable. Thus, the blend ratio of copolymer/polybutene-1 has been discovered to reach its optimum value at a 75/25 ratio within the optimum ratio range of 70/30 to 80/20.

It should be noted that changing the ethylene content in the copolymer would change the optimum range. For example, it has been found that using an ethylene-propylene copolymer of 2.5 percent ethylene, the optimum blend using the procedures described above was 66 percent copolymer and 34 percent polybutene-1. On the other hand, if the ethylene content of the copolymer is increased to 4 percent it could be expected that the percentage of the copolymer would be increased in order the obtain the optimum ratio. However, ethylene-propylene copolymers having an ethylene content of greater than 4 percent are not readily available at the present time.

The results of the various tests conducted with the different blend ratios are briefly summarized in the examples set forth below:

EXAMPLE I

Bags were prepared by the process described hereinabove wherein the ethylene-propylene copolymer content was 66 percent and the polybutene-1 content was 34 percent. A total of 1,500 of these bags were used to package whole turkeys. Of this total, 29 rejects were produced with 19 of these being related to bag material. A total of 2,250 standard bags were used to package whole turkeys in the same production run and produced 29 rejects of which 19 were related to bag material failure. Thus, the test bag produced 1.3 percent overall rejects comparted with 0.75 percent for the standard bag. While not superior to the standard, this test indicated that the test bags were capable of approximately the same performance.

EXAMPLE II

Test bags having a blend ratio of 75/25 percent copolymer/polybutene-1 were prepared according to the process described above. 2,000 turkeys were packaged in the test bag and 2,000 were packaged in the standard bags. The test bags had 0.3 percent overall rejects compared with 0.8 percent rejects for the standard bag. Sheen and/or gloss was noticably more attractive on the test bags; and, after freezing 11 standard bags were torn and no test bags were torn. Thus, the bags in this test demonstrated superior abuse resistance to the standard.

EXAMPLE III

Test bags having a blended coating of 68 percent ethylene-propylene copolymer with 32 percent polybutene-1 were prepared according to the above described method. In a test involving 2,144 bags, the test bags produced 1.3 percent rejects due to bag failures while the standard bag 1.2 percent rejects for the same reason. Thus, the test bags were favorably comparable to the standard bags in this test.

Thus, as the foregoing examples demonstrate, the blended mixture of the present invention has optimum properties when the weight percent copolymer/weight percent polybutene-1 is in the range of 70/30 to 80/20 for a copolymer having an ethylene content of 3.0 to 3.5 percent. However, a laminate can be made with a copolymer percentage as low as 60 percent and as high as 95 percent when the ethylene content of the copolymer is in the 2.5 to 4 percent range but in the extremes of such a range there is a sacrifice in abuse resistance and in orientability. Furthermore, if the percentage of ethylene in the copolymer is increased, the proportion of copolymer may be increased and an ethylene content in the copolymer in the range between 0.1 and 10 percent is within the scope of the present invention although, at the present, copolymer having greater than 4 percent ethylene is not available in commercial quantities. In addition, the blend of the present invention is not limited to a single process such as the extrusion coating process described above as it may be cast upon the substrate or may be made as a self-supporting film which may be adhesively bonded to a substrate if desired.

The substrate of the present invention is preferably an ethylene-vinyl acetate copolymer having a vinyl acetate content between 0 to 5 percent, preferably between 2 to 4 percent by weight, and which has been crosslinked by irradiation in the dosage range of 2 to 7 mr. Higher dosages may be used but are not economical. As the substrate is extruded the cooling water which impinges upon it is preferably in the range between 40° to 70°F. The preferred adhesive to bond the ethylene-propylene/polybutene-1 layer to the substrate is an ethylene-vinyl acetate copolymer having 7 to 20 percent vinyl acetate and preferably about 8½ percent by weight.

The preferred embodiment of the present invention which is a blended thermoplastic composition having 70 to 80 percent by weight of an ethylene-propylene copolymer having 3.0 to 3.5 percent by weight of ethylene and 30 to 20 percent by weight of polybutene-1 provides either a self-supporting film or a layer or coating for a substrate which can be oriented in hot water, i.e. water from about 160° to 212°F, and which has a unique and novel combination of properties which cannot be achieved with the constituents of the blend alone. For example, the blend provides a film or coating with gloss and without tackiness or the need to dust the film or coating plus toughness and orientability thereby giving a combination of strength and softness not heretofore available. In addition, the ability of films made from blends according the present invention to be oriented from hot water results in significant commercial advantages as the need for relatively inefficient radiant or hot air heat sources is eliminated.

The thickness of a film or a layer as extruded from the blended composition of the present invention may range from 2.0 to 13.0 mils and when stretched at the preferred ratio of about 12 to 1, thicknesses in the range from ¼ mil to over 1.0 mil result.

Having described my invention, I claim:

1. A multi-layer thermoplastic film comprising:
    a. a substrate layer comprising an oriented, cross-linked polymer of ethylene; and,
    b. a coating layer comprising a blended mixture having a (1) major portion of an ethylene-propylene copolymer wherein the ethylene constituent of said copolymer is in the range of 0.1 to 10 percent by weight with a (2) minor portion of polybutene-1.
2. The multi-layer film of claim 1 wherein said coating layer comprises 60 to 95 percent by weight of an ethylene-propylene copolymer and 40 to 5 percent by weight of polybutene-1.
3. The multi-layer film of claim 2 wherein said coating layer comprises ethylene-propylene copolymer in the range of 70 to 80 percent by weight and polybutene-1 in the range of 30 to 20 percent by weight.
4. The film of claim 1 wherein both the substrate and coating are oriented.
5. The multi-layer film of claim 1 wherein the ethylene constituent of said copolymer is in the range from 2.5 to 4.0 percent by weight.
6. The multi-layer film of claim 1 wherein said cross-linked polymer of ethylene is a cross-linked copolymer of ethylene vinyl acetate with 2 to 4 percent vinyl acetate.
7. The multi-layer film of claim 1 wherein said substrate layer is a seamless tube and said coating layer is on the outside of said tube.
8. The multi-layer film of claim 1 including an adhesive layer between said substrate and said coating layers.
9. A method of improving the tear and abuse resistance of and reducing the tackiness of multi-layer, oriented thermoplastic film comprising the steps of:
    a. providing a tubular substrate comprising a cross-linked polymer of ethylene;
    b. inflating said tubular substrate; and,
    c. coating said tubular substrate by coextruding thereon a blended mixture comprising a major portion of an ethylene-propylene copolymer and a minor portion of polybutene-1, the ethylene constituent of said copolymer being in the range of 0.1 to 10 percent weight.
10. The method of claim 9 wherein said ethylene-propylene copolymer comprises 60 to 95 percent by weight of said coating mixture and said polybutene-1 comprises 40 to 5 percent of said mixture.
11. The method of claim 9 wherein said blended mixture comprises ethylene-propylene copolymer in the range of 70 to 80 percent by weight and polybutene-1 in the range of 30 to 20 percent by weight.

* * * * *